United States Patent
James et al.

(10) Patent No.: US 9,286,302 B2
(45) Date of Patent: Mar. 15, 2016

(54) INODE REUSE SYSTEMS AND METHODS

(75) Inventors: Freddy James, Kerala (IN); Kedar Patwardhan, Maharashtra (IN); Sudheer Keshav Chepa, Pune (IN)

(73) Assignee: Symantec Corporation, Mountain View, CA (US)

( * ) Notice: Subject to any disclaimer, the term of this patent is extended or adjusted under 35 U.S.C. 154(b) by 430 days.

(21) Appl. No.: 12/914,892

(22) Filed: Oct. 28, 2010

(65) Prior Publication Data

US 2012/0109921 A1   May 3, 2012

(51) Int. Cl.
*G06F 17/30*   (2006.01)

(52) U.S. Cl.
CPC .............................. *G06F 17/30091* (2013.01)

(58) Field of Classification Search
USPC .......................................................... 707/705
See application file for complete search history.

(56) References Cited

U.S. PATENT DOCUMENTS

| | | | |
|---|---|---|---|
| 5,001,628 A * | 3/1991 | Johnson et al. | |
| 2006/0059204 A1 * | 3/2006 | Borthakur et al. | 707/200 |
| 2006/0168409 A1 * | 7/2006 | Kahn et al. | 711/161 |
| 2006/0248273 A1 * | 11/2006 | Jernigan et al. | 711/114 |
| 2009/0265780 A1 * | 10/2009 | Korkus et al. | 726/22 |

OTHER PUBLICATIONS

Mark, "Common Misconfigured HP-UX Resources", Global Solutions Engineering, 2006 Hewlett-Pakard Development Company.*
Common Misconfigured HP-UX Resources, Mark Ray, Global Solution Engineering, 2006 Hewlett-Packard Development Company.*
Symantec Corporation, "Veritas™ Volume Replicator Administrator's Guide", Solaris, 5.0 Maintenance Pack 3, 2008.
Symantec Corporation, "Veritas™ Volume Manager Administrator's Guide", Solaris, 5.0 Maintenance Pack 3, 2008.
"Improving inode Caching", XFS.org, http://xfs.org/index.php/Improving_inode_Caching, last modified on Dec. 18, 2008, printed Oct. 8, 2010.

* cited by examiner

*Primary Examiner* — Belix M Ortiz Ditren
(74) *Attorney, Agent, or Firm* — Wilmer Cutler Pickering Hale and Dorr LLP

(57) ABSTRACT

Systems and methods for inode use are presented. In one embodiment; an inode reuse method includes: receiving an indication of an operation that involves access to file related information; assigning an inode to the access; identifying one of a plurality of inode reuse scenarios for the inode; and making the inode available for reuse in accordance with the one of the plurality of inode reuse scenarios. In one embodiment, the one of the plurality of inode reuse scenarios is a relatively expedited reuse scenario. In one exemplary implementation, the relatively expedited inode reuse scenario is utilized if the inode is not required for further processing associated with the operation. The inode can be reused for another immediately subsequent operation. In one embodiment, a first one of the plurality of inode reuse scenarios includes placing the inode at a head queue position of a use queue and a second one of the plurality of inode reuse scenarios includes placing the inode in a tail queue position of the use queue. Association of the inode to the inode reuse scenario can be tracked. The tracking can include flagging the inode for relatively expedited reuse.

18 Claims, 10 Drawing Sheets

100

110
An operation that involves inode access is initiated.

120
An inode utilization method is performed, including expedited inode reuse analysis.

130
The operation is completed.

210
Receiving an indication of an operation that involves access to file related information.

220
Assigning an inode to the access.

230
Identifying one of a plurality of inode reuse scenarios for the inode.

240
Making the inode available for reuse in accordance with the one of the plurality of inode reuse scenarios.

310
An inode reuse trigger indication analysis is performed to determine what type of reuse an inode is available for.

320
A first one of a plurality of inode reuse scenarios is selected based upon the inode reuse trigger indication analysis performed in block 310.

330
A second one of a plurality of inode reuse scenarios is selected based upon the inode reuse trigger indication analysis performed in block 310.

410
A flag is set if a first inode reuse scenario is selected.

420
A flag is not set if a second inode reuse scenario is selected.

810
Inode operation indication receiving module.

820
Inode assigning module.

830
Inode reuse scenarios identification module.

> 831
> An inode reuse trigger indication analysis module.
>
> 832
> A first inode reuse scenario selection module.
>
> 833
> A second inode reuse scenario selection module.

840
Inode availability module.

FIG 8

INODE REUSE SYSTEMS AND METHODS

FIELD OF THE INVENTION

The present embodiments relate to the field of information storage.

BACKGROUND OF THE INVENTION

Electronic systems and circuits are often utilized in a number of applications to achieve advantageous results. Numerous electronic technologies such as computers, video equipment, and communication systems facilitate increased productivity and cost reduction in analyzing and communicating information in most areas of business, science, education and entertainment. Frequently, these activities involve storage of vast amounts of important and confidential information and significant resources are expended storing and processing the information. Traditional maintenance and management of accesses to file system related information (e.g., inodes, etc.) can also often involve considerable utilization or "consumption" of system resources.

Traditional approaches to information storage often involve file systems that define how information is stored in various storage media. Many file systems utilize data structures to track information associated with a file. One exemplary data structure that file systems often use is an inode. An inode is typically entered in an inode cache when an activity or operation involves a file related information. Conventional processing systems usually include a variety of operations that involve accessing files associated with inodes and many of the operations (e.g., find file, list files (ls), etc.) involve accessing numerous files. For example, in a large file system with millions of files, a find file operation can involve accessing millions of the files and corresponding conventional entry of numerous inodes in the inode cache. Maintaining large inode caches can result in a number of adverse impacts (e.g., inode cache bloating, slowed responsiveness, extensive inode cleanup overhead, system hangs, etc.) that affect system resources and performance.

SUMMARY

Systems and methods for inode use are presented. In one embodiment; an inode reuse method includes: receiving an indication of an operation that involves access to file related information; assigning an inode to the access; identifying one of a plurality of inode reuse scenarios for the inode; and making the inode available for reuse in accordance with the one of the plurality of inode reuse scenarios. In one embodiment, the one of the plurality of inode reuse scenarios is a relatively expedited reuse scenario. In one exemplary implementation, the relatively expedited inode reuse scenario is utilized if the inode is not required for further processing associated with the operation. The inode can be reused for another immediately subsequent operation. In one embodiment, a first one of the plurality of inode reuse scenarios includes placing the inode at a head queue position of a use queue and a second one of the plurality of inode reuse scenarios includes placing the inode in a tail queue position of the use queue. Association of the inode to the inode reuse scenario can be tracked. The tracking can include flagging the inode for relatively expedited reuse.

In one embodiment, a computer readable storage medium having stored thereon, computer executable instructions that, when executed by a computer system cause the computer system to perform a method comprising: receiving an indication of an operation that involves access to file related information; assigning an inode to the access; identifying one of a plurality of inode reuse scenarios for the inode; and making the inode available for reuse in accordance with the one of the plurality of inode reuse scenarios. In one embodiment, the one of the plurality of inode reuse scenarios is a relatively expedited reuse scenario. In one exemplary implementation, the relatively expedited inode reuse scenario is utilized if the inode is not required for further processing associated with the operation. The inode can be reused for another immediately subsequent operation. In one embodiment, a first one of the plurality of inode reuse scenarios includes placing the inode at a head queue position of a use queue and a second one of the plurality of inode reuse scenarios includes placing the inode in a tail queue position of the use queue. Association of the inode to the inode reuse scenario can be tracked. The tracking can include flagging the inode for relatively expedited reuse.

In one embodiment, a computer system, includes: a computer system having a processor coupled to a computer readable storage media and executing computer readable code which causes the computer system to perform operations including: receiving an indication of an operation that involves access to file related information; assigning an inode to the access; identifying one of a plurality of inode reuse scenarios for the inode; and making the inode available for reuse in accordance with the one of the plurality of inode reuse scenarios. In one embodiment, the one of the plurality of inode reuse scenarios is a relatively expedited reuse scenario. In one exemplary implementation, the relatively expedited inode reuse scenario is utilized if the inode is not required for further processing associated with the operation. The inode can be reused for another immediately subsequent operation. In one embodiment, a first one of the plurality of inode reuse scenarios includes placing the inode at a head queue position of a use queue and a second one of the plurality of inode reuse scenarios includes placing the inode in a tail queue position of the use queue. Association of the inode to the inode reuse scenario can be tracked. The tracking can include flagging the inode for relatively expedited reuse.

DESCRIPTION OF THE DRAWINGS

The accompanying drawings, which are incorporated in and form a part of this specification, are included for exemplary illustration of the principles of the present embodiments and not intended to limit the present invention to the particular implementations illustrated therein. The drawings are not to scale unless otherwise specifically indicated.

FIG. 1 is a block diagram of an exemplary information processing method in accordance with one embodiment of the present invention.

FIG. 2 is a block diagram of an exemplary inode utilization method in accordance with one embodiment of the present invention.

FIG. 3 is a block diagram of an exemplary inode reuse scenario selection process in accordance with one embodiment of the present invention.

FIG. 4 is a block diagram of an exemplary selected inode reuse scenario tracking method in accordance with one embodiment of the present invention.

FIG. 8 is a block diagram of an exemplary inode utilization module which includes instructions for directing a processor in performance of an inode utilization method in accordance with one embodiment of the present invention.

DETAILED DESCRIPTION

Figure 5:
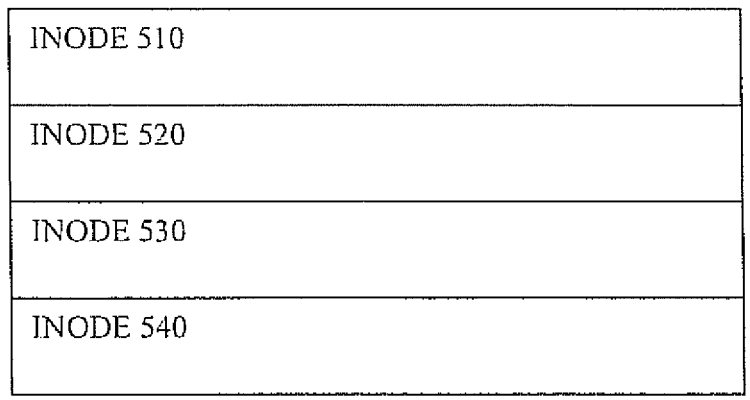
FIG. 5 is a block diagram of an exemplary inode use queue with several inodes designated for use in accordance with one embodiment of the present invention.

Reference will now be made in detail to the preferred embodiments, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope as defined by the appended claims. Furthermore, in the following detailed description, numerous specific details are set forth in order to provide a thorough understanding. However, one ordinarily skilled in the art will understand that the present invention may be practiced without these specific details. In other instances, well known methods, procedures, components, and circuits have not been described in detail as not to unnecessarily obscure aspects of the current invention.

The systems and methods facilitate efficient and effective reuse of inodes. In one embodiment, inode reuse is relatively expedited enabling reduction in the number of different unique inodes being maintained in an inode cache at a given time. Reducing the number of different unique inodes being simultaneously maintained in an inode cache facilitates reduction of potential undesirable adverse impacts (e.g., inode cache bloating, slowed responsiveness, extensive inode cleanup overhead, system hangs, etc.) that would otherwise affect system resources and performance. The systems and methods can be utilized in a variety of different architectures and environments, including systems with a relatively large number of files.

In one embodiment, an inode utilization method can include a relatively expedited reuse scenario in which an inode can be reused for an immediately subsequent operation (e.g., an immediately subsequent access, immediately subsequent lookup, etc.). In one exemplary implementation, the inode can be initially associated with a lookup of a first file as part of a list file (LS) operation and when the lookup of the first file is complete, the inode can be reused for an immediately subsequent lookup of a second file as part of the list file (LS) operation. The inode utilization method can also include a relatively extended or delayed reuse scenario in which inode availability for reuse is relatively delayed. In one exemplary implementation, the extended or delayed reuse scenario is associated with opening a file and the relatively extended or delayed time lasts until the operation is complete and access to the inode is not required. Additional description of inode utilization is set forth in following portions of the detailed description.

FIG. 1 is a block diagram of exemplary information processing method 100 in accordance with one embodiment of the present invention. In one embodiment, information processing method 100 includes operations on data stored in accordance with a file system and inodes associated with the file system. Information processing method 100 can facilitate relatively expedited inode reuse.

In block 110, an operation that involves inode access is initiated. In one embodiment, file information is associated with an inode and the operation includes using the file information. An operation that involves inode access can include operations associated with a find file command, a list file (LS) command, a write command, and various other commands.

In block 120, an inode utilization method is performed. In one embodiment, the inode utilization method includes an expedited inode analysis. An expedited inode reuse process can make inodes available for reuse at a relatively rapid rate. In one exemplary implementation, the expedited inode reuse process makes inodes available for reuse when the inode is not currently required for further utilization. The expedited inode reuse process can be utilized for operations that involve a lookup (e.g., find file operation, list file operation, etc.) and access is no longer required (e.g., the file is not opened, etc.). The rapid availability of inodes for reuse can facilitate reduced inode cache bloating. Additional explanation of inode utilization and reuse in accordance with the present invention is set forth in following portions of the detailed description.

In block 130, the operation is completed. For example, a file is found, a file list is presented, data is written to a file, a read file is opened and closed, etc. In one embodiment, an inode can be also be made available for reuse when the operation is completed.

FIG. 2 is a block diagram of exemplary inode utilization method 200 in accordance with one embodiment of the present invention. In one embodiment, inode utilization method 200 can be utilized as an inode utilization method in block 120. In one exemplary implementation, inode utilization method 200 facilitates expedited reuse of inodes. The expedited reuse of inodes can reduce consumption or occupation of inode cache resources.

In block 210, an indication of an operation that involves access file related information is received. It is appreciated that the operation can be a passive operation or the operation can be an active operation. In one embodiment, a passive operation (e.g., find file, list (ls) files, etc.) is one in which a file or information about a file is looked up without opening the file and an active operation (read, write, etc.) is one in which a file is looked up and opened.

In block 220, an inode is assigned to the access (e.g., in response to an operation, a lookup, etc.). In one embodiment, the inode assigned to the access is entered in the inode cache. An inode assignment process can be utilized to assign the inode. In one embodiment, an inode assignment process includes assigning an inode from a set of inodes available for use. The inode can be a new inode used for the first time or the inode can be an inode eligible for reuse. The set of available inodes for reuse can be determined from an inode use queue. In one exemplary implementation, an available inode can be assigned based upon being in a position (e.g., head, top, front, middle, tail, bottom, back, etc.) of the inode use queue. The queue can correspond to a data structure, a list, an inode cache, etc. Additional description of inode placement in an inode use queue is set forth in following sections of the detailed description.

In block 230, one of a plurality of inode reuse scenarios for the inode is identified. In one embodiment, an inode reuse scenario selection process is performed. The identified or selected one of the plurality of inode reuse scenarios can include an expedited reuse scenario or an extended or delayed reuse scenario. Additional descriptions of inode reuse scenario selection processes are set forth in following sections of the detailed description.

In block 240, the inode is made available for reuse in accordance with the identified scenario in block 230. In one embodiment, the inode is "returned" to the set of inodes available for reuse. In one exemplary implementation, the inode is placed in a head (e.g., top, front, beginning, etc.) queue position of a inode use queue if an expedited reuse scenario is identified or selected in block 230 and the inode is placed in a tail (e.g., bottom, back, last, etc.) queue position of a inode use queue if an extended or delayed reuse scenario is identified or selected in block 230.

FIG. 3 is a block diagram of exemplary inode reuse scenario selection process 300 in accordance with one embodiment of the present invention. In one embodiment, inode reuse scenario selection process 300 can be utilized as an inode reuse scenario selection process of block 230. In one exemplary implementation, inode reuse scenario selection process 300 selects or identifies an inode reuse scenario based upon whether continued access to an inode is required or not.

In block 310, an inode reuse trigger indication analysis is performed to determine what type of reuse an inode is available for. In one embodiment, an indication of the type of operation being performed on the file information is utilized as an inode reuse trigger indication and is analyzed to determine if an inode is available for expedited reuse. In one exemplary implementation, whether the type of operation involves opening a file is analyzed.

In block 320, a first one of a plurality of inode reuse scenarios is selected based upon the inode reuse trigger indication analysis performed in block 310. In one embodiment, a relatively expedited reuse scenario can be selected. If analysis in block 310 of the type of operation being performed (e.g., a find file operation, a list files operation, etc.) indicates the inode is not required to be retained for further access to complete the operation beyond an initial access, the corresponding inode can be made available for relatively expedited reuse. The analysis of block 310 can indicate that once a lookup (e.g., associated with a find file operation, a list file operation, etc.) is performed the inode is not required for further processing associated with the operation and a relatively expedited reuse scenario can be selected.

In block 330, a second one of a plurality of inode reuse scenarios is selected based upon the inode reuse trigger indication analysis performed in block 310. In one embodiment, a relatively extended or delayed reuse scenario can be selected. If analysis in block 310 of the type of operation being performed (e.g., an operation that opens the file, a write operation, a read operation, etc.) indicates the inode is required to be retained for further access to complete the operation beyond an initial access, the corresponding inode can be made unavailable for reuse for an extended or delayed time. The analysis of block 310 can indicate that a file is required for further processing associated with an operation (e.g., the file is opened, etc.) and a relatively expedited reuse scenario can be selected.

It is appreciated that an extended or delayed reuse availability time can correspond to times associated with a variety of activities or metrics. In one exemplary implementation, an extended or delayed reuse availability time corresponds to the time it takes an inode to progress from a position in an inode use queue. The extended or delayed reuse availability time can correspond to the time it takes an inode to progress from a tail position in a reuse queue to a head position in a reuse queue. In one exemplary implementation, the extended or delayed reuse availability time can correspond to a time to complete various operations (e.g., open and close a file, etc.) that may require access to the inode again before reuse. The extended or delayed reuse availability time can correspond to operations that need the inode to be present in the inode cache for extended periods of time. The operations that need the inode to be present in the inode cache for extended periods of time can be platform dependent.

It is appreciated that present system and methods can be implemented with various mechanisms or approaches for tracking an inode association to a selected inode reuse scenario. In one embodiment, the tracking includes flagging the inode for association to the selected inode reuse scenario. In one exemplary implementation, a flag is set or not set to indicate a selected inode reuse scenario. A flag can be set to indicate an expedited inode reuse scenario and not set to indicate an extended or delayed inode reuse scenario or vise versa. In one exemplary implementation, an operation involving opening a file triggers the flag being set.

FIG. 4 is a block diagram of exemplary selected inode reuse scenario tracking method 400 in accordance with one embodiment of the present invention.

In block 410, a flag is set if a first inode reuse scenario is selected. In one embodiment, the first inode reuse scenario is an expedited inode reuse scenario. In one embodiment, the flag is set if inode reuse scenario is selected or identified in block 320.

In block 420, a flag is not set if a second inode reuse scenario is selected. In one embodiment, the second inode reuse scenario is a relatively extended or delayed reuse scenario. In one embodiment, the flag is not set if inode reuse scenario is selected or identified in block 330.

FIG. 5 is a block diagram of an exemplary inode use queue with several inodes designated for use in accordance with one embodiment of the present invention. The inode use queue includes inodes 510, 520, 530, and 540. Inodes 510, 520, 530 and 540 are still being used for operations and are not yet available for reuse.

Figure 6:
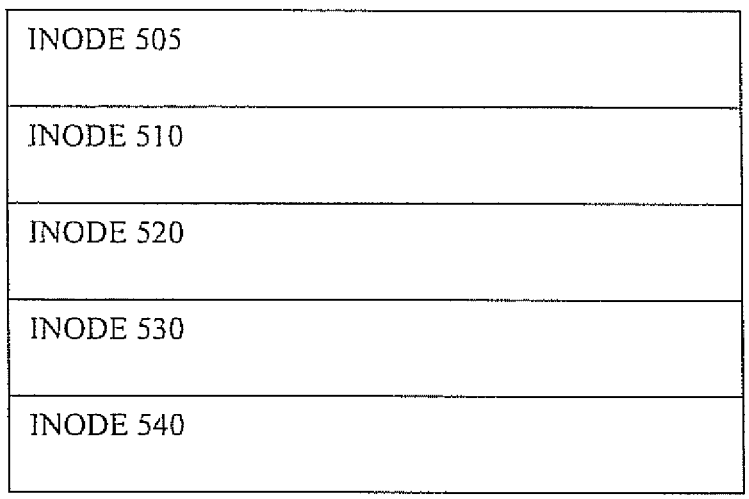
FIG. 6 is a block diagram of an exemplary inode use queue when an expedited inode reuse scenario is being performed in accordance with one embodiment of the present invention.

FIG. 6 is a block diagram of an exemplary inode use queue when an expedited inode reuse scenario is being performed in accordance with one embodiment of the present invention. The inode 505 is added or placed at the head of the queue. The inode 505 can be utilized or reused for several operations. In one exemplary implementation, inode 505 is reused as each file is traversed in association with find file or list file operations. Inode 505 can be used for lookup of a first file associated with a find file command and inode 505 can be reused for a lookup of a second file associated with a find file command. Inode 505 can continue to be reused for a lookup of as many subsequent files associated with a find file command until an indicated file is found. In one exemplary implementation, one inode is utilized for an entire system scan. The inode 505 can remain at the head of the queue and be flagged as available for reuse.

Figure 7:
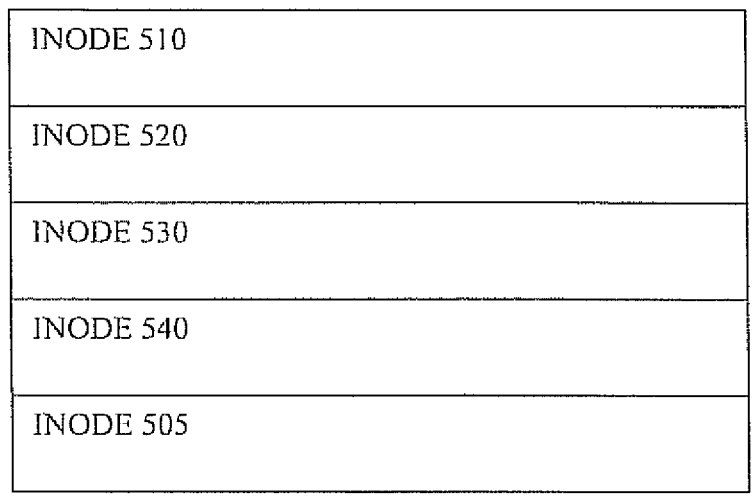
FIG. 7 is a block diagram of an exemplary inode use queue when an extended or delayed inode reuse scenario is being performed in accordance with one embodiment of the present invention.

FIG. 7 is a block diagram of an exemplary inode use queue when an extended or delayed inode reuse scenario is being performed in accordance with one embodiment of the present invention. The inode 505 is associated with an operation (e.g., an operation in which the file is opened, a write, a read, etc.) that involves extended or delayed use of the inode 505 and inode 505 is moved or placed at the tail of the queue.

It is appreciated that present inode use systems and methods are compatible with a variety of different types of inodes. In one embodiment, an inode contains information about a file. Information in an inode can include the type of file, permissions associated with the file, the link count, the file's size, information about when the inode or file was last accessed and modified and/or a version number for the inode, address(es) that point to data block(s) that store the actual contents of the file (that is, the file data itself) and various other information. A unique inode identifier (e.g., name, number, etc) is assigned to an inode although the unique inode identifier is not necessarily included in the inode data structure. The unique inode identifier can serve as index into storage used to maintain the inodes. In one exemplary implementation, the inode is accessed when an operation involves information about a file.

FIG. 8 is a block diagram of inode utilization module 800 which includes instructions for directing a processor in performance of an inode utilization method (e.g., an inode utilization method 200, etc.) in accordance with one embodiment of the present invention. Inode utilization module 800 includes inode operation indication receiving module 810, inode assigning module 820, inode reuse scenarios identification module 830, and inode availability module 840. Inode operation indication receiving module 810 includes instructions for receiving an indication of an operation that involves access to file related information. In one embodiment, inode operation indication receiving module 810 includes instructions for receiving an indication of an operation that involves access to file related information as indicated in block 210. Inode assigning module 820 includes instructions for assigning an inode to the access. In one embodiment, inode assigning module 820 includes instructions for assigning an inode to the access as indicated in block 220. Inode reuse scenarios identification module 830 includes instructions identifying or selecting one of a plurality of inode reuse scenarios for the inode. In one embodiment, inode reuse scenarios identification module 830 includes instructions identifying or selecting one of a plurality of inode reuse scenarios for the inode as indicated in block 230. Inode availability module 840 includes instructions for making the inode available for reuse in accordance with the one of the plurality of inode reuse scenarios. In one embodiment, inode availability module 840 includes instructions for making the inode available for reuse in accordance with the one of the plurality of inode reuse scenarios as indicated in block 240.

In one embodiment, inode reuse scenarios identification module includes inode reuse trigger indication analysis module 831, a first inode reuse scenario selection module 832 and a second inode reuse scenario selection module 833. Inode reuse trigger indication analysis module 831 includes instructions for determining what type of reuse an inode is available for. In one embodiment, inode reuse trigger indication analysis module 831 includes instructions for determining what type of reuse an inode is available for as indicated in block 310. A first inode reuse scenario selection module 832 includes instructions for selecting a first one of a plurality of inode reuse scenarios based upon the inode reuse trigger indication analysis performed by inode reuse trigger indication analysis module 831. In one embodiment, first inode reuse scenario selection module 832 includes instructions for selecting a first one of a plurality of inode reuse scenarios as indicated in block 320. A second inode reuse scenario selection module 833 includes instructions for selecting a second one of a plurality of inode reuse scenarios based upon the inode reuse trigger indication analysis performed by inode reuse trigger indication analysis module 831. In one embodiment, second inode reuse scenario selection module 833 includes instructions for selecting a second one of a plurality of inode reuse scenarios as indicated in block 330.

Figure 9:
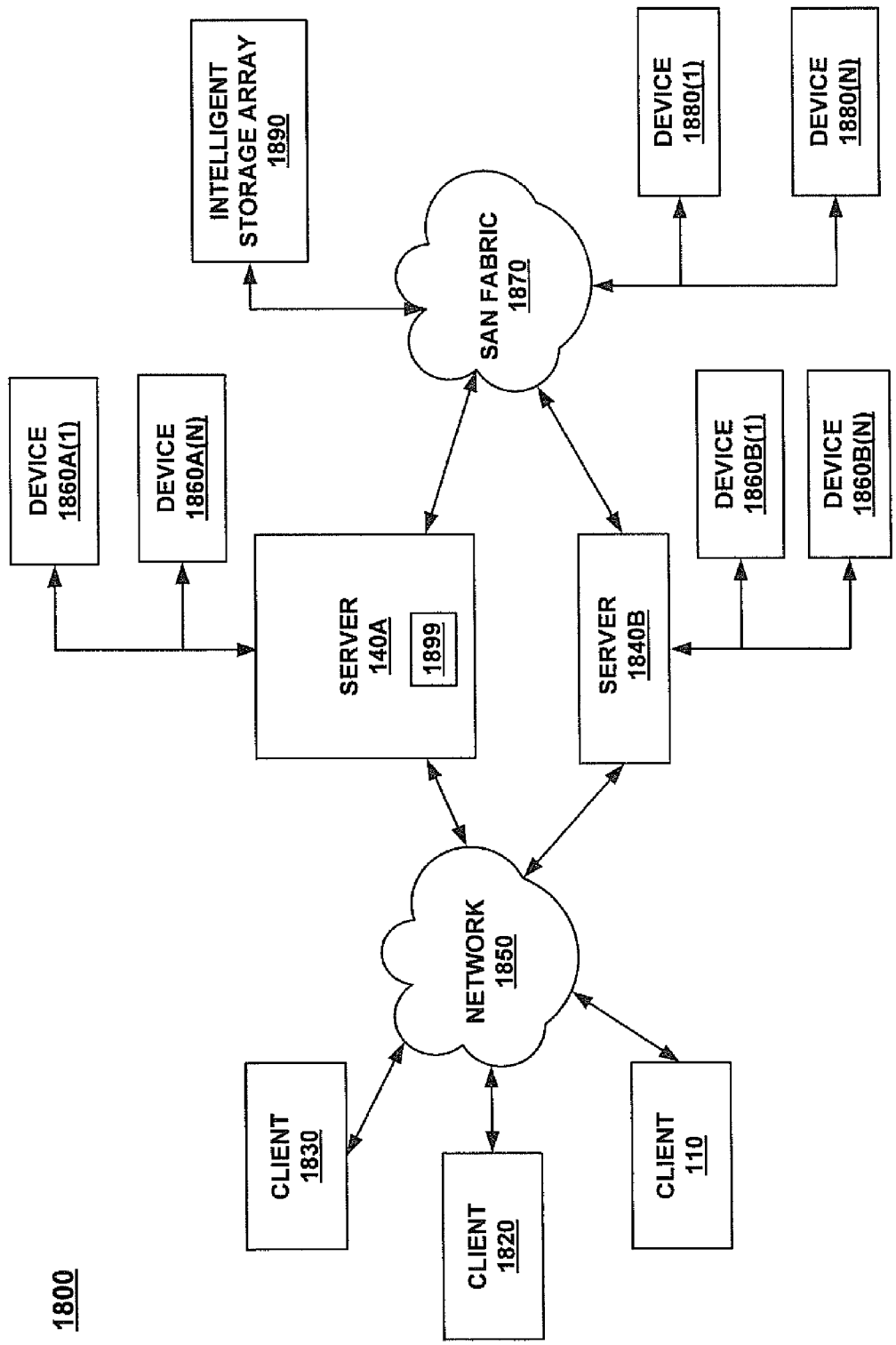
FIG. 9 is a block diagram depicting an exemplary network architecture in accordance with one embodiment of the present invention.

In one embodiment, an inode utilization method (e.g., inode utilization method 200, etc.) can be implemented on a network. FIG. 9 is a block diagram depicting a network architecture 1800 in which client systems 1810, 1820 and 1830, as well as storage servers 1840A and 1840B (any of which can be implemented using computer system 1110), are coupled to a network 1850. Storage server 1840A is further depicted as having storage devices 1860A (1)-(N) directly attached, and storage server 1840B is depicted with storage devices 1860B (1)-(N) directly attached. Storage servers 1840A and 1840B are also connected to a SAN fabric 1870, although connection to a storage area network is not required for operation of the disclosure. SAN fabric 1870 supports access to storage devices 1880(1)-(N) by storage servers 1840A and 1840B, and so by client systems 1810, 1820 and 1830 via network 1850. Intelligent storage array 1890 is also shown as an example of a specific storage device accessible via SAN fabric 1870. In one embodiment, server 1840A includes inode utilization module 1899. In one embodiment, an inode utilization module 1899 is similar to similar to inode utilization module 800. It is appreciated that present systems and methods are compatible with a variety of implementations. For example, portions of information and instructions associated with can be distributed in various resources.

Figure 10:
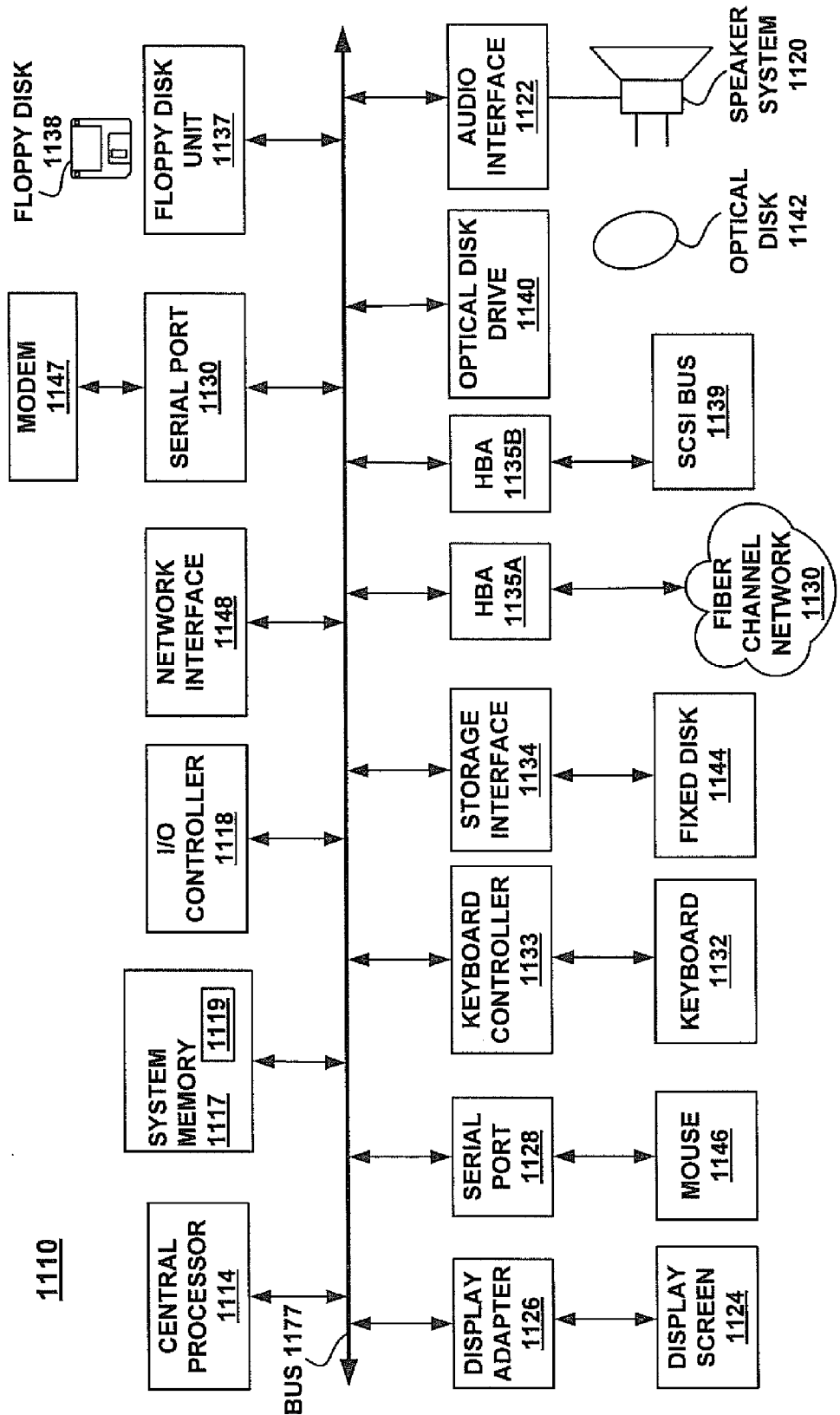
FIG. 10 depicts a block diagram of an exemplary computer system suitable for implementing the present method in accordance with one embodiment of the present invention.

FIG. 10 depicts a block diagram of an exemplary computer system 1110 suitable for implementing the present methods. Computer system 1110 includes a bus 1177 which interconnects major subsystems of computer system 1110, such as a central processor 1114, a system memory 1117 (typically RAM, but which may also include ROM, flash RAM, or the like), an input/output controller 1118, an external audio device, such as a speaker system 1120 via an audio output interface 1122, an external device, such as a display screen 1124 via display adapter 1126, serial ports 1128 and 1130, a keyboard 1132 (interfaced with a keyboard controller 1133), a storage interface 1134, a floppy disk drive 1137 operative to receive a floppy disk 1138, a host bus adapter (HBA) interface card 1135A operative to connect with a Fiber Channel network 1190, a host bus adapter (HBA) interface card 1135B operative to connect to a SCSI bus 1139, and an optical disk drive 1140 operative to receive an optical disk 1142. Also included are a mouse 1146 or other point-and-click device (coupled to bus 1112 via serial port 1128), a modem 1147 (coupled to bus 1112 via serial port 1130), and a network interface 1148 (coupled directly to bus 1112).

Bus 1177 allows data communication between central processor 1114 and system memory 1117, which may include read-only memory (ROM) or flash memory (neither shown), and random access memory (RAM) (not shown), as previously noted. In one embodiment, instructions for performing an inode utilization method (e.g., similar to inode utilization method 200, etc.) are stored in one or more memories of computer system 1100 (e.g., in memory location 1119). The RAM is generally the main memory into which the operating system and application programs are loaded. In one embodiment, RAM 1117 includes an inode utilization module (e.g., in memory location 1119). In one embodiment, an inode utilization module stored in memory location 1119 is similar to inode utilization module 800. The ROM or flash memory can contain, among other code, the Basic Input-Output system (BIOS) which controls basic hardware operation such as the interaction with peripheral components. Applications resident with computer system 1110 are generally stored on and accessed via a computer readable medium, such as a hard disk drive (e.g., fixed disk 1144), an optical drive (e.g., optical drive 1140), floppy disk unit 1137, or other storage medium. Additionally, applications can be in the form of electronic signals modulated in accordance with the application and data communication technology when accessed via network modem 1147 or interface 248.

Storage interface 1134, as with the other storage interfaces of computer system 1110, can connect to a standard computer readable medium for storage and/or retrieval of information, such as a fixed disk drive 1144. Fixed disk drive 1144 may be a part of computer system 1110 or may be separate and accessed through other interface systems. Modem 1147 may provide a direct connection to a remote server via a telephone link or to the Internet via an internet service provider (ISP). Network interface 1148 may provide a direct connection to a remote server via a direct network link to the Internet via a POP (point of presence). Network interface 1148 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 10 need not be present to practice the present disclosure. The devices and subsystems can be interconnected in different ways from that shown in FIG. 10. Code to implement the present disclosure can be stored in computer-readable storage media such as one or more of system memory 1117, fixed disk 1144, optical disk 1142, or floppy disk 1138. The operating system provided on computer system 1110 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

With reference to computer system 1110, modem 1147, network interface 1148 or some other method can be used to provide connectivity from each of client computer systems 1810, 1820 and 1830 to network 1850. Client systems 1810, 1820 and 1830 are able to access information on network addressable storage using, for example, a transfer coordination component, a web browser, or other client software (not shown). Such a client allows client systems 1810, 1820 and 1830 to access data hosted by storage server 1840 or 1880 or one of the corresponding storage devices. FIG. 9 depicts the use of a network such as the Internet for exchanging data, but the present disclosure is not limited to the Internet or any particular network-based environment.

Thus, the present systems and methods facilitate efficient and effective inode utilization. Present systems and methods facilitate expedited reuse of inodes. Present system and method archiving solutions can compliment existing infrastructures. Relatively expedited inode reuse enables reduction in the number of inodes being maintained in an inode cache at a given time. Reducing the number inodes being simultaneously maintained in an inode cache facilitates reduction of potential undesirable adverse impacts (e.g., inode cache bloating, slowed responsiveness, extensive inode cleanup overhead, system hangs, etc.) that would otherwise affect system resources and performance.

Portions of the detailed description are presented and discussed in terms of a method. Although steps and sequencing thereof are disclosed in figures herein describing the operations of this method, such steps and sequencing are exemplary. Embodiments are well suited to performing various other steps or variations of the steps recited in the flowchart of the figure herein, and in a sequence other than that depicted and described herein. Some portions of the detailed description are presented in terms of procedures, steps, logic blocks, processing, and other symbolic representations of operations on data bits that can be performed within a computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps include physical manipulations of physical quantities. Usually, though not necessarily, these quantities take the form of electrical, magnetic, optical or quantum signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as "processing", "computing", "calculating", "determining", "displaying", "accessing," "writing," "including," "storing," "transmitting," "traversing," "associating," "identifying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Computing devices can include at least some form of computer readable media. Computer readable media can be any available media that can be accessed by a computing device. By way of example, and not limitation, computer readable medium may comprise computer storage media. Computer storage media includes volatile and nonvolatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other medium which can be used to store the desired information and which can be accessed by a computing device. Communication media typically embodies carrier waves or other transport mechanism and includes any information delivery media. By way of example, and not limitation, communication media includes wired media such as a wired network or direct-wired connection, and wireless media such as acoustic, RF, infrared, other wireless media, and combinations of any of the above.

Some embodiments may be described in the general context of computer-executable instructions, such as program modules, executed by one or more computers or other devices. Generally, program modules include routines, programs, objects, components, data structures, etc, that perform particular tasks or implement particular abstract data types. The functionality of the program modules may be combined or distributed as desired in various embodiments.

The foregoing descriptions of specific embodiments have been presented for purposes of illustration and description. They are not intended to be exhaustive or to limit the invention to the precise forms disclosed, and many modifications and variations are possible in light of the above teaching. The embodiments were chosen and described in order to best explain the principles and its practical application, to thereby enable others skilled in the art to best utilize the invention and various embodiments with various modifications as are suited to the particular use contemplated. It is intended that the scope be defined by the Claims appended hereto and their equivalents.

What is claimed is:

1. An inode reuse method comprising:
   receiving an indication of an operation to be executed with respect to a file, the operation including access to information related to the file;
   assigning an inode from a plurality of inodes to said access based upon a position of the inode in an inode use queue, wherein the indication of the operation is separate from the plurality of inodes;
   determining a type of the operation to be executed by analyzing the received indication of the operation to be executed;
   selecting one of a plurality of predetermined inode reuse scenarios for said inode based on the determined type of the operation to be executed; and
   making said inode available for reuse in accordance with said one of said plurality of inode reuse scenarios by placing the inode in the inode use queue,
   wherein when a first one of said plurality of inode reuse scenarios is selected for a first type of operation, the inode is placed at a head queue position of the inode use queue, and wherein when a second one of said plurality of inode reuse scenarios is selected for a second type of operation, the inode is placed in a tail queue position of the inode use queue.

2. The inode reuse method of claim 1, wherein said one of said plurality of inode reuse scenarios is a relatively expedited reuse scenario.

3. The inode reuse method of claim 2, wherein said relatively expedited inode reuse scenario is utilized when the determined type indicates that said inode is not required for further processing associated with said operation.

4. The inode reuse method of claim 1, wherein said inode is reused for another immediately subsequent operation.

5. The inode reuse method of claim 1, further comprising:
   tracking an association of said inode to said inode reuse scenario.

6. The inode reuse method of claim 5, wherein said tracking includes flagging said inode for relatively expedited reuse and wherein the type of the operation to be executed is one of a passive operation in which the file is not opened and an active operation in which the file is opened.

7. A non-transitory computer readable storage medium having stored thereon, computer executable instructions that, when executed by a computer system cause the computer system to perform a method comprising:
   receiving an indication of an operation to be executed with respect to a file, the operation including access to information related to the file;
   assigning an inode from a plurality of inodes to said access based upon a position of the inode in an inode use queue, wherein the indication of the operation is separate from the plurality of inodes;
   determining a type of the operation to be executed by analyzing the received indication of the operation to be executed;
   selecting one of a plurality of predetermined inode reuse scenarios for said inode based on the determined type of the operation to be executed; and
   making said inode available for reuse in accordance with said one of said plurality of inode reuse scenarios by placing the inode in the inode use queue,
   wherein when a first one of said plurality of inode reuse scenarios is selected for a first type of operation, the inode is placed at a head queue position of the inode use queue, and wherein when a second one of said plurality of inode reuse scenarios is selected for a second type of operation, the inode is placed in a tail queue position of the inode use queue.

8. The computer readable storage medium of claim 7, wherein said one of said plurality of inode reuse scenarios is a relatively expedited reuse scenario.

9. The non-transitory computer readable storage medium of claim 8, wherein said relatively expedited inode reuse scenario is utilized when the determined type indicates that said inode is not required for further processing associated with said operation.

10. The non-transitory computer readable storage medium of claim 7, wherein said inode is reused for another immediately subsequent operation.

11. The non-transitory computer readable storage medium of claim 7, further comprising:
    tracking an association of said inode to said inode reuse scenario.

12. The non-transitory computer readable storage medium of claim 11, wherein said tracking includes flagging said inode for relatively expedited reuse and wherein the type of the operation to be executed is one of a passive operation in which the file is not opened and an active operation in which the file is opened.

13. A computer system, comprising:
    a processor coupled to a computer readable storage media and executing computer readable code which causes the computer system to perform operations including:
    receiving an indication of an operation to be executed with respect to a file, the operation including access to information related to the file;
    assigning an inode from a plurality of inodes to said access based upon a position of the inode in an inode use queue, wherein the indication of the operation is separate from the plurality of inodes;
    determining a type of the operation to be executed by analyzing the received indication of the operation to be executed;
    selecting one of a plurality of predetermined inode reuse scenarios for said inode based on the determined type of the operation to be executed; and
    making said inode available for reuse in accordance with said one of said plurality of inode reuse scenarios by placing the inode in the inode use queue, wherein when a first one of said plurality of inode reuse scenarios is selected for a first type of operation, the inode is placed at a head queue position of the inode use queue, and wherein when a second one of said plurality of inode reuse scenarios is selected for a second type of operation, the inode is placed in a tail queue position of the inode use queue.

14. The computer system of claim 13, wherein said one of said plurality of inode reuse scenarios is a relatively expedited reuse scenario.

15. The computer system of claim 14, wherein said relatively expedited inode reuse scenario is utilized when the determined type indicates that said inode is not required for further processing associated with said operation.

16. The computer system of claim 13, wherein said inode is reused for another immediately subsequent operation.

17. The computer system of claim 13, further comprising: tracking an association of said inode to said inode reuse scenario.

18. The inode reuse method of claim 1, wherein the second type of operation requires use of the inode beyond an initial file access and reuse of the inode is delayed for a predetermined period of time corresponding to a time for the inode placed in the tail queue position of said inode use queue to move to the head queue position of the inode use queue.

* * * * *